(12) United States Patent
Iwasa

(10) Patent No.: US 11,473,984 B2
(45) Date of Patent: Oct. 18, 2022

(54) REFLECTIVE LIQUID CRYSTAL DISPLAY APPARATUS INCLUDING PIXELS AND TEMPERATURE SENSOR

(71) Applicant: JVCKENWOOD CORPORATION, Yokohama (JP)

(72) Inventor: Takayuki Iwasa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 342 days.

(21) Appl. No.: 16/804,453

(22) Filed: Feb. 28, 2020

(65) Prior Publication Data

US 2020/0200612 A1 Jun. 25, 2020

Related U.S. Application Data

(63) Continuation of application No. PCT/JP2018/025436, filed on Jul. 5, 2018.

(30) Foreign Application Priority Data

Aug. 31, 2017 (JP) ................ JP2017-166723

(51) Int. Cl.
*G09G 3/00* (2006.01)
*G01K 13/00* (2021.01)
*G09G 3/36* (2006.01)

(52) U.S. Cl.
CPC ............ *G01K 13/00* (2013.01); *G09G 3/006* (2013.01); *G09G 3/36* (2013.01); *G09G 3/3659* (2013.01); *G09G 2300/0413* (2013.01); *G09G 2300/0456* (2013.01); *G09G 2320/041* (2013.01)

(58) Field of Classification Search
CPC ...................................................... G09G 3/006
See application file for complete search history.

(56) References Cited

U.S. PATENT DOCUMENTS

| | | | | |
|---|---|---|---|---|
| 2007/0057887 A1* | 3/2007 | Itakura | ................. | G09G 3/3659 345/90 |
| 2009/0147164 A1* | 6/2009 | Toyoshima | .............. | H04N 5/70 349/39 |
| 2010/0214271 A1* | 8/2010 | Mizusako | ........... | G09G 3/3648 345/204 |
| 2012/0183011 A1* | 7/2012 | Fujikawa | ............. | G09G 3/3611 374/103 |

(Continued)

FOREIGN PATENT DOCUMENTS

| | | |
|---|---|---|
| JP | 2010078942 A | 4/2010 |
| JP | 2011085619 A | 4/2011 |

(Continued)

*Primary Examiner* — William Boddie
*Assistant Examiner* — Andrew B Schnirel
(74) *Attorney, Agent, or Firm* — Procopio, Cory, Hargreaves & Savitch LLP

(57) ABSTRACT

According to one embodiment, a reflective liquid crystal display apparatus includes a plurality of pixels and a temperature sensor. Further, the temperature sensor included in the reflective liquid crystal display apparatus is formed in one or more regions among a plurality of pixel regions partitioned into rows and columns. The reflective liquid crystal display apparatus can thereby measure the temperature of the pixels more accurately at real time compared with the case of using a temperature sensor attached onto a heatsink.

3 Claims, 12 Drawing Sheets

(56) References Cited

U.S. PATENT DOCUMENTS

2014/0232706 A1* 8/2014 Iwasa .................. G02F 1/13624
345/206

FOREIGN PATENT DOCUMENTS

| JP | 2013167455 A | 8/2013 |
| JP | 2015-114375 A | 6/2015 |
| JP | 5733154 B2 | 6/2015 |

* cited by examiner

REFLECTIVE LIQUID CRYSTAL DISPLAY APPARATUS INCLUDING PIXELS AND TEMPERATURE SENSOR

CROSS REFERENCE TO RELATED APPLICATION

This application is a Bypass Continuation of International Application No. PCT/JP2018/025436 filed on Jul. 5, 2018, which is based upon and claims the benefit of priority from Japanese patent application No. 2017-166723 filed on Aug. 31, 2017, the disclosure of which is incorporated herein in its entirety by reference.

BACKGROUND

The present invention relates to a reflective liquid crystal display apparatus and, for example, relates to a reflective liquid crystal display apparatus suitable for accurately measuring the temperature of pixels.

As one of halftone display methods of liquid crystal display apparatuses, a subframe driving method is known. The subframe driving method which is one type of a time axis modulation method divides a predetermined period (e.g., one frame which is a display unit of one image in a case of a moving image) into a plurality of subframes, and drives pixels based on a combination of subframes matching a tone which needs to be displayed. The tone to be displayed is determined according to a rate of a pixel driving period which occupies in the predetermined period, and this rate is specified based on the combination of the subframes.

In some liquid crystal display apparatuses which employ the subframe driving method, each pixel includes a master latch and a slave latch, a liquid crystal display element, and a plurality of switching transistors.

In this pixel, when one-bit first data is applied to an input terminal of the master latch via a first switching transistor and a row selection signal to be applied via a row scan line activates, the first switching transistor enters an on state, and the first data is written in the master latch.

When writing data in the master latches provided in all pixels is finished, second switching transistors provided in all pixels enter an on state in this subframe period. Thus, data of the master latches provided in all pixels is read all at once and written in the slave latches, and the data written in the slave latches is applied to pixel electrodes of the liquid crystal display elements. The same processing is performed on all pixels in each subframe period. As a result, each pixel can display a desired tone based on a combination of a plurality of subframes which compose one frame.

In addition, periods of a plurality of subframes which compose one frame are respectively allocated to the same or different predetermined periods in advance. When, for example, performing maximum tone display (displaying white), each pixel performs display in all of a plurality of subframes which compose one frame. When performing minimum tone display (displaying black), each pixel does not perform display in all of a plurality of subframes which compose one frame. When performing other tone display, each pixel selects a subframe which is displayed according to a tone to be displayed. A liquid crystal display apparatus which employs this conventional method receives digital data indicating a tone as input data, and employs a digital driving method of a two-stage latch configuration (see, for example, Japanese Patent No. 5733154).

A liquid crystal display apparatus generally includes a temperature sensor for detecting the temperature of pixels. In the case of using a liquid crystal display apparatus as a projector element, high-intensity lamp light is input to the liquid crystal display apparatus, which can increase the temperature of the liquid crystal display apparatus and cause malfunction. Therefore, by controlling a cooling fan rotation speed based on the temperature of pixels detected by the temperature sensor, the temperature of the liquid crystal display apparatus is maintained constant. The structure of Japanese Patent No. 5733154 is quite likely to include a temperature sensor.

However, because the front side of a pixel is generally covered with a glass to display an image, and the back side of a pixel is generally provided with a heatsink to dissipate the heat of the pixel. The temperature sensor cannot be disposed in close proximity to the pixel. A temperature error of −5° C. to +5° C. occurs between the pixel temperature and the heatsink temperature. Thus, the structure of Japanese Patent No. 5733154 has a problem that the temperature of a pixel cannot be measured accurately.

SUMMARY

A reflective liquid crystal display apparatus according to an aspect of an embodiment includes a plurality of pixels and a temperature sensor, and the temperature sensor is formed in one or more regions among a plurality of pixel regions partitioned into rows and columns.

DETAILED DESCRIPTION

First Embodiment

An embodiment of the present invention will be described hereinafter with reference to the drawings.

Figure 1:
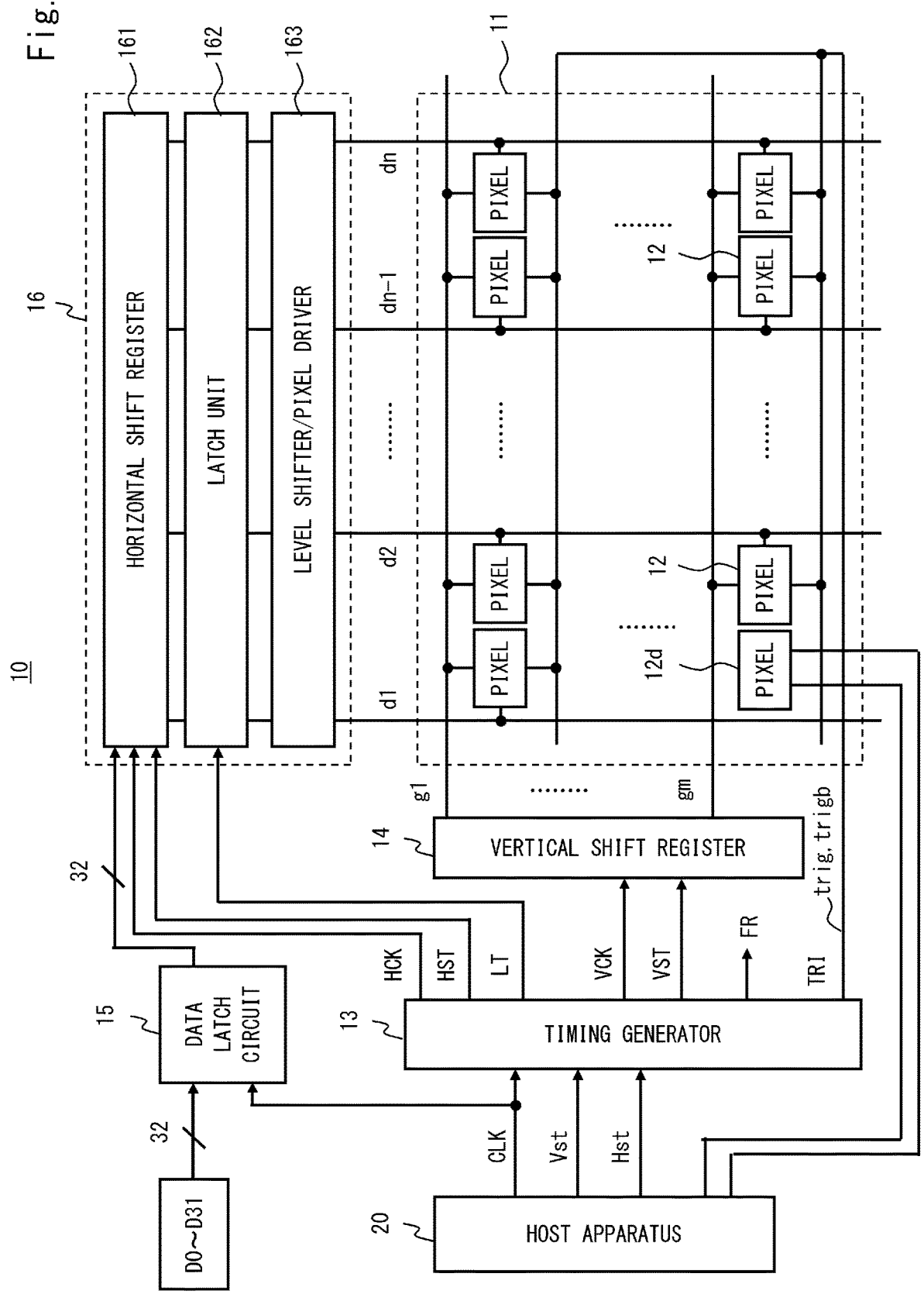
FIG. 1 is a block diagram illustrating a liquid crystal display apparatus according to a first embodiment.

FIG. 1 is a block diagram illustrating a reflective liquid crystal display apparatus 10 according to the first embodiment.

As illustrated in FIG. 1, the reflective liquid crystal display apparatus 10 includes an image display unit 11, a timing generator 13, a vertical shift register 14, a data latch circuit 15 and a horizontal driver 16. The horizontal driver 16 includes a horizontal shift register 161, a latch unit 162 and a level shifter/pixel driver 163.

The image display unit 11 includes a plurality of pixels 12 regularly arranged in each of a plurality of pixel regions partitioned into rows and columns. In some (at the lower left in the figure) of the plurality of pixel regions, a dummy pixel 12d is disposed instead of the pixel 12. The dummy pixel 12d is composed of a dummy liquid crystal display element and a circuit unit, and a temperature sensor S1 for detecting the temperature of the pixel 12 is formed in this circuit unit. By controlling a cooling fan rotation speed based on the temperature of the pixel 12 detected by the temperature sensor S1, the temperature of the pixel 12 is maintained constant. The details of the dummy pixel 12d are described later.

The plurality of pixels 12 are arranged in a two-dimensional matrix pattern at a plurality of at intersection points where each pair of m (m is a natural number of 2 or more) number of row scan lines g1 to gm having one end connected to the vertical shift register 14 and extending in a row direction (X direction) and n (n is a natural number of 2 or more) number of column data lines dl to do having one end connected to the level shifter/pixel driver 163 and extending in a column direction (Y direction) intersects. All of the pixels 12 in the image display unit 11 are connected in common to trigger lines trig, trigb, one end of which are connected to the timing generator 13.

In addition, a forward trigger pulse TRI transmitted by the forward trigger pulse trigger line trig, and an inverted trigger pulse TRIB transmitted by the inverted trigger pulse trigger line trigb have a relationship (complementary relationship) of a reverse logical value at all times.

The timing generator 13 receives external signals such as a vertical synchronization signal Vst, a horizontal synchronization signal Hst and a basic clock CLK as input signals outputted from a host apparatus 20, and generates various internal signals such as alternating signal FR, a V start pulse VST, an H start pulse HST, clock signals VCK and HCK, a latch pulse LT and the trigger pulses TRI and TRIB based on these external signals.

The alternating signal FR is a signal which inverts the polarity per subframe, and is supplied as a common electrode voltage Vcom described below to a common electrode of liquid crystal display elements in the pixels 12 which constitute the image display unit 11.

The start pulse VST is a pulse signal which is outputted at a start timing of each subframe described below, and this start pulse VST controls switching of subframes.

The start pulse HST is a pulse signal outputted to the horizontal shift register 161 at a start timing of the horizontal shift register 161.

The clock signal VCK is a shift clock which defines one horizontal scan period (1H) in the vertical shift register 14, and the vertical shift register 14 performs a shifting operation at a timing of the clock signal VCK.

The clock signal HCK is a shift clock of the horizontal shift register 161, and is a signal for shifting data at a 32-bit width.

The latch pulse LT is a pulse signal which is outputted at a timing at which the horizontal shift register 161 finishes shifting data corresponding to the number of pixels of one row in a horizontal direction.

The forward trigger pulse TRI and the inverted trigger pulse TRIB are pulse signals which are supplied to all the pixels 12 in the image display unit 11 via the trigger lines trig and trigb, respectively.

In addition, the forward trigger pulse TRI and the inverted trigger pulse TRIB are outputted from the timing generator 13 after data is written in first data holding units in all the pixels 12 in the image display unit 11 in a certain subframe period. Thus, in this subframe period, data held by the first data holding units in all the pixels 12 in the image display unit 11 is transferred all at once to second data holding units in the associated pixels 12.

The vertical shift register 14 transfers the V start pulse VST supplied at the start timing of each subframe according to the clock signal VCK, and sequentially supplies exclusively a row scan line to the row scan lines g1 to gm in a 1H unit. Thus, the row scan lines are sequentially selected one by one in the 1H unit from the row scan line g1 at the top of the image display unit 11 to the row scan line gm at the bottom.

The data latch circuit 15 latches data of the 32-bit width in one subframe unit supplied from an unillustrated external circuit based on the basic clock CLK from the host apparatus 20, and then outputs the data to the horizontal shift register 161 in synchronization with the basic clock CLK.

In addition, the reflective liquid crystal display apparatus 10 divides one frame of a video signal into a plurality of subframes having shorter display periods than one frame period of this video signal, and displays a tone based on a combination of these subframes. Hence, the above external circuit converts tone data indicating the tone of each pixel into a plurality of items of one-bit subframe data corresponding to a plurality of subframes. Furthermore, the above external circuit collectively supplies subframe data associated with 32 pixels belonging to the same subframe as the data of the 32-bit width to the data latch circuit 15.

When the horizontal shift register 161 is a processing system of one-bit serial data, the horizontal shift register 161 starts shifting according to the start pulse HST supplied at an initial stage of the 1H from the timing generator 13, and shifts the data of the 32-bit width supplied from the data latch circuit 15 in synchronization with the clock signal HCK.

When the horizontal shift register 161 finishes shifting data corresponding to the same number of n bits as the number of pixels n of one row of the image display unit 11, the latch unit 162 latches the data corresponding to the n bits (i.e., subframe data associated with the n pixels) supplied in parallel from the horizontal shift register 161 in synchronization with the latch pulse LT supplied from the timing generator 13, and outputs the data to the level shifter of the level shifter/pixel driver 163. In addition, when the latch unit 162 finishes the data transfer, the timing generator 13 outputs the start pulse HST again, and the horizontal shift register 161 resumes shifting the data of the 32-bit width from the data latch circuit 15 according to the clock signal HCK.

The level shifter of the level shifter/pixel driver 163 level-shifts to a liquid crystal driving voltage amplitude a signal level of the n items of subframe data associated with the n pixels of one row transferred from the latch unit 162. The pixel driver of the level shifter/pixel driver 163 outputs then items of level-shifted subframe data associated with the n pixels of one row in parallel to the n column data lines dl to dn.

In one horizontal scan period, the horizontal driver 16 outputs subframe data to pixels of a row selected as a data write target, and shifts the subframe data for the pixels of the row selected as the data write target in next one horizontal scan period in parallel. Furthermore, in a certain horizontal scan period, the n items of subframe data associated with the n pixels of one row are outputted as data signals in parallel and all at once to the n column data lines dl to dn, respectively.

The n pixels 12 of one row selected according to a row scan signal from the vertical shift register 14 among a plurality of pixels 12 which constitute the image display unit 11 sample the n items of subframe data of one row outputted all at once from the level shifter/pixel driver 163 via the n column data lines dl to dn, and write the n items of subframe data in the first data holding unit in each pixel 12 described below.

Although the pixel 12 will be described in detail below, inverted data of input data held in a storage unit SM1 is applied to a reflecting electrode PE in the pixel 12. That is, the pixel 12 has a function of inverting the input data supplied from the level shifter/pixel driver 163.

(Specific Configuration of Pixel 12)

Next, the specific configuration of the pixel 12 will be described.

Figure 2:
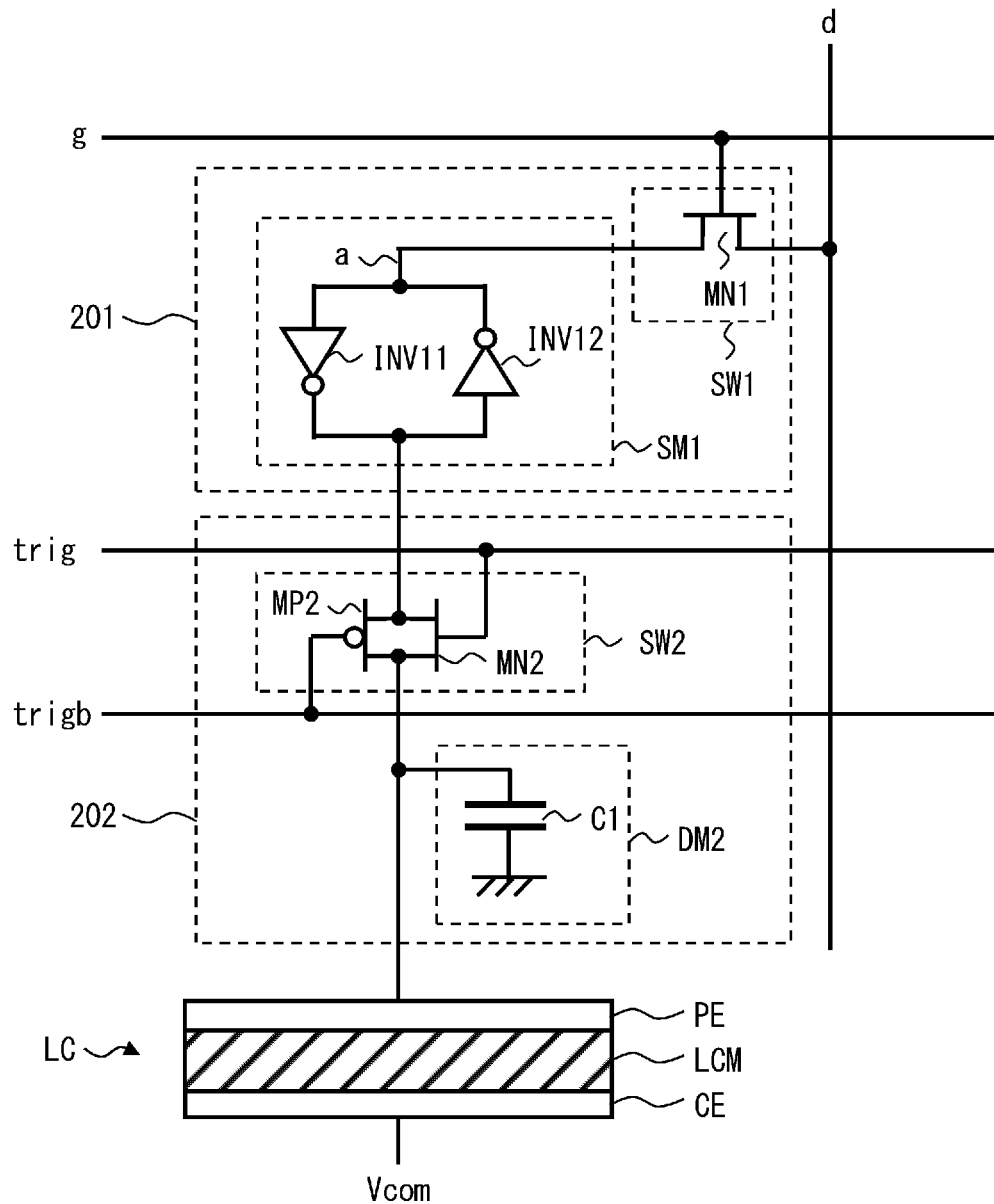
FIG. 2 is a circuit diagram illustrating a specific configuration of a pixel provided to the liquid crystal display apparatus illustrated in FIG. 1.

FIG. 2 is a circuit diagram illustrating the specific configuration of the pixel 12.

As illustrated in FIG. 2, the pixel 12 is provided at an intersection portion at which one of the row scan lines g1 to gm (referred to as a row scan line g below) and one of the column data lines dl to do (referred to as a column data line below) intersect.

The pixel 12 includes an SRAM cell 201, a DRAM cell 202 and a liquid crystal display element LC. The SRAM cell 201 includes a switch SW1 which is a first switch, and the storage unit SM1 which is the first data holding unit. The DRAM cell 202 includes a switch SW2 which is a second switch, and the storage unit DM2 which is the second data holding unit. The liquid crystal display element LC has a known structure where liquid crystal LCM is filled and sealed between a reflecting electrode PE being a pixel electrode having light reflectivity and a common electrode CE having light transmissivity, which are disposed facing apart from each other.

(Configuration of SRAM Pixel 201)

The switch SW1 includes, for example, an N channel MOS transistor (referred to as an NMOS transistor below) MN1. The NMOS transistor MN1 which constitutes the switch SW1 includes a source which is connected to an input terminal (node a) of the storage unit SM1, a drain which is connected to the column data line d and a gate which is connected to the row scan line g.

The storage unit SM1 is a self-holding memory which includes two inverters INV11 and INV12 whose one output terminal is connected to the other input terminal. More specifically, the input terminal of the inverter INV11 is connected to the output terminal of the inverter INV12 and the source of the NMOS transistor MN1 which constitutes the switch SW1. The input terminal of the inverter INV12 is connected to the switch SW2 and the output terminal of the inverter INV11.

Figure 3:
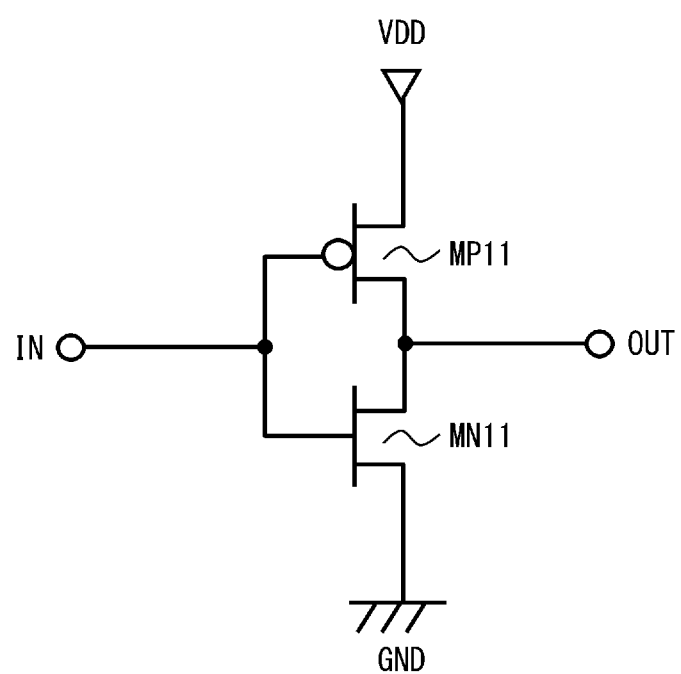
FIG. 3 is a circuit diagram illustrating a specific configuration of an inverter which constitutes a first data holding unit provided to the pixel illustrated in FIG. 2.

FIG. 3 is a circuit diagram illustrating a specific configuration of the inverter INV11.

As illustrated in FIG. 3, the inverter INV11 is a known CMOS inverter which includes a P channel MOS transistor (referred to as a PMOS transistor below) MP11 and an NMOS transistor MN11 connected in series, and inverts input signals supplied to respective gates and outputs the signals from respective drains. Similarly, the inverter INV12 is a known CMOS inverter which includes a P channel PMOS transistor MP12 and an NMOS transistor MN12 connected in series, and inverts input signals supplied to respective gates and outputs the signals from respective drains.

In this regard, driving capability of the inverters INV11 and INV12 differs. More specifically, the driving capability of the transistors MP11 and MN11 in the inverter INV11 which is an input side seen from the switch SW1 among the inverters INV11 and INV12 which constitute the storage unit SM1 is higher than the driving capability of the transistors MP12 and MN12 in the inverter INV12 which is an output side seen from the switch SW1. Consequently, while data readily propagates from the column data line d to the storage unit SM1 via the switch SW1, data hardly propagates from the storage unit DM2 to the storage unit SM1 via the switch SW2.

Furthermore, the driving capability of the NMOS transistor MN1 which constitutes the switch SW1 is higher than the driving capability of the NMOS transistor MN12 which constitutes the inverter INV12. Consequently, when, for example, data indicating an H level on the column data line d is stored in the storage unit SM1, the current flowing from the column data line d to the input terminal (node a) of the storage unit SM1 via the switch SW1 is higher than the current flowing from the input terminal of the storage unit SM1 to a ground voltage terminal GND via the NMOS transistor MN12, so that it is possible to accurately store the data in the storage unit SM1.

(Configuration of DRAM Cell 202)

The switch SW2 is a known transmission gate which includes an NMOS transistor MN2 and a PMOS transistor MP2 connected in parallel. More specifically, the NMOS transistor MN2 and the PMOS transistor MP2 each include a source which is commonly connected to the output terminal of the storage unit SM1, and a drain which is commonly connected to the input terminal of the storage unit DM2 and the reflecting electrode PE of the liquid crystal display element LC. Furthermore, a gate of the NMOS transistor MN2 is connected to the forward trigger pulse trigger line trig, and a gate of the PMOS transistor MP2 is connected to the inverted trigger pulse trigger line trigb.

When, for example, the forward trigger pulse supplied via the trigger line trig is at the H level (the inverted trigger pulse supplied via the trigger line trigb is at an L level), the switch SW2 enters an on state, and transfers data read from the storage unit SM1 to the storage unit DM2 and the reflecting electrode PE. Furthermore, when the forward trigger pulse supplied via the trigger line trig is at the L level (the inverted trigger pulse supplied via the trigger line trigb is at the H level), the switch SW2 enters an off state, and does not read storage data from the storage unit SM1.

The switch SW2 is the known transmission gate, so that it is possible to transfer the voltage in a wide range from the ground voltage GND to the power supply voltage VDD in the on state. More specifically, when the voltage to be applied from the storage unit SM1 to the sources of the transistors MN2 and MP2 is at a ground voltage GND level (L level), while the source and the drain of the PMOS transistor MP2 do not conduct, the source and the drain of the NMOS transistor MN2 can conduct at a low resistance. On the other hand, when the voltage to be applied from the storage unit SM1 to the sources of the transistors MN2 and MP2 is at a power supply voltage VDD level (H level), while the source and the drain of the NMOS transistor MN2 do not conduct, the source and the drain of the PMOS transistor MP2 can conduct at a low resistance. Consequently, the source and the drain of the transmission gate can conduct at the low resistance, so that the switch SW2 can transfer the voltage in a wide range from the ground voltage GND to the power supply voltage VDD in the on state.

The storage unit DM2 includes a capacitance C1. As the capacitance C1, for example, a MIM (Metal Insulation Metal) capacitance which forms a capacitance between wirings, a Diffusion capacitance which forms a capacitance between a substrate and a polysilicon or a PIP (Poly Insulator Poly) capacitance which forms a capacitance between a two-layer polysilicon can be used.

When the switch SW2 is turned on, data stored in the storage unit SM1 is read, and is transferred to the capacitance C1 in the storage unit DM2 and the reflecting electrode PE via the switch SW2. Consequently, the data stored in the storage unit DM2 is overwritten.

In this regard, when the switch SW2 is turned on, the data held in the capacitance C1 influences on an input gate of the inverter INV12, too, which constitutes the storage unit SM1. However, the driving capability of the inverter INV11 is higher than the driving capability of the inverter INV12, and therefore before the inverter INV12 is influenced by the data of the capacitance C1, the inverter INV11 overwrites the data in the capacitance C1. Consequently, the held data in the capacitance C1 does not unintentionally overwrite the data of the storage unit SM1.

Thus, the reflective liquid crystal display apparatus 10 according to the present embodiment uses the pixels 12 which each include one SRAM cell and one DRAM cell and consequently reduce the number of transistors which constitute each pixel compared to a case where pixels each including two SRAM cells are used, and realize miniaturization of the pixels.

The present embodiment has described a case where the switch SW2 includes the PMOS transistor MP2 and the NMOS transistor MN2, yet is not limited to this. The switch SW2 can be optionally changed to a configuration provided with one of the PMOS transistor MP2 and the NMOS transistor MN2. In this case, only one of the trigger lines trig and trigb is provided.

In addition, the reflective liquid crystal display apparatus 10 can not only realize miniaturization of the pixels by reducing the number of transistors which constitute each pixel, but also realize the miniaturization of the pixels by effectively disposing the storage units SM1 and DM2 and the reflecting electrode PE in an element height direction as described below. Details will be described below with reference to FIG. 4.

(Cross-Sectional Structure of Pixel 12)

Figure 4:
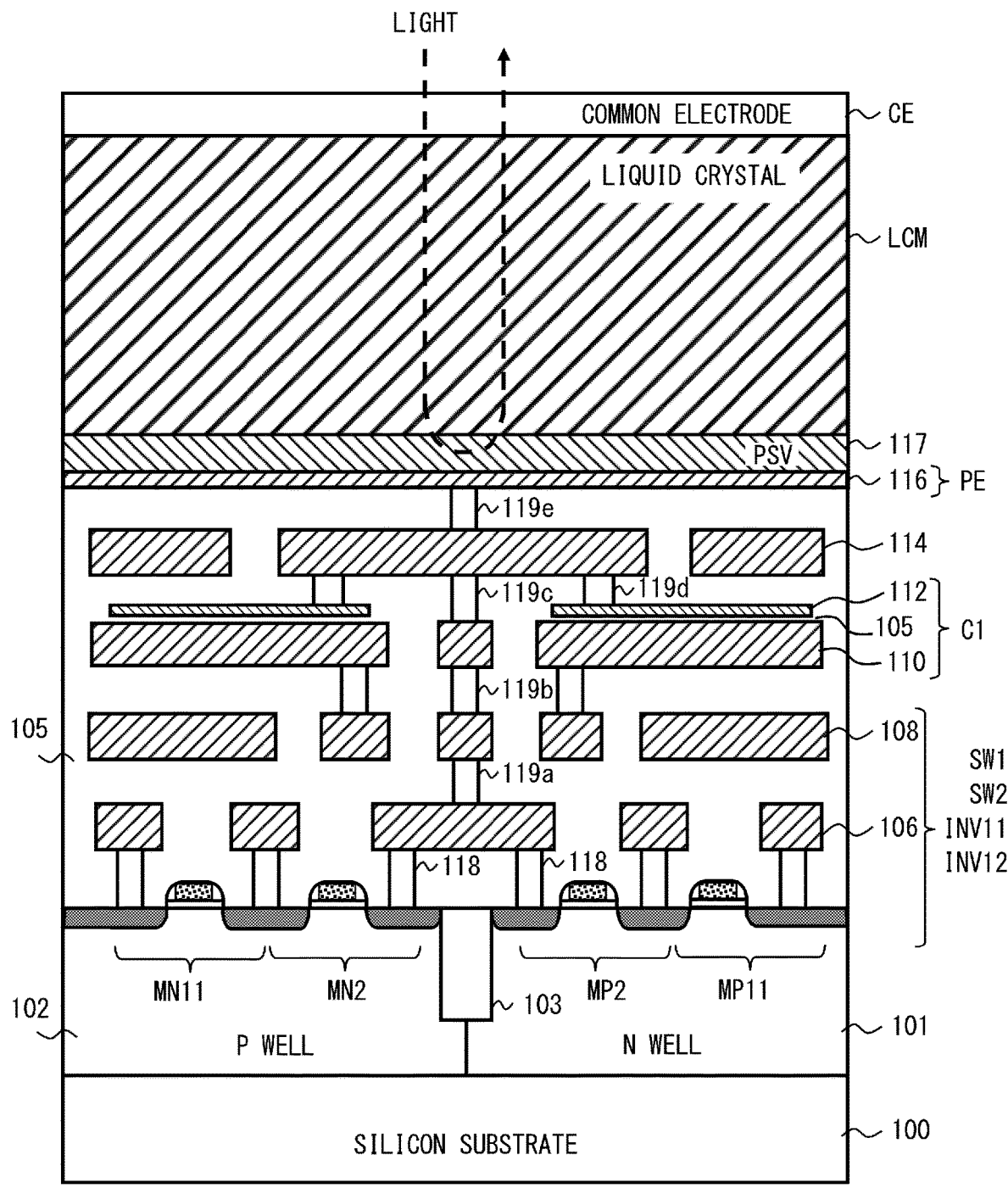
FIG. 4 is a schematic cross-sectional view of the pixel illustrated in FIG. 2.

FIG. 4 is a schematic cross-sectional view illustrating main units of the pixel 12. Furthermore, a case where the capacitance C1 is constituted by the MIM which forms a capacitance between wirings will be described as an example with reference to FIG. 4.

As illustrated in FIG. 4, an N well 101 and a P well 102 are formed on a silicon substrate 100.

The PMOS transistor MP2 of the switch SW2 and the PMOS transistor MP11 of the inverter INV11 are formed on the N well 101. More specifically, a common diffusion layer which is a source of each of the PMOS transistors MP2 and MP11, and two diffusion layers which are the drains are formed on the N well 101, and a polysilicon which is a gate of each of the PMOS transistors MP2 and MP11 is formed with a gate oxide film interposed therebetween on a channel region between the common diffusion layer and the two diffusion layers.

The NMOS transistor MN2 of the switch SW2 and the NMOS transistor MN11 of the inverter INV11 are formed on the P well 102. More specifically, a common diffusion layer which is a source of each of the NMOS transistors MN2 and MN11 and two diffusion layers which are drains are formed on the P well 102, and a polysilicon which is a gate of each of the NMOS transistors MN2 and MN11 is formed with a gate oxide film interposed therebetween on a channel region between the common diffusion layer and the two diffusion layers.

In addition, an element separation oxide film 103 is formed between an activation region (the diffusion layers and the channel region) on the N well and an activation region on the P well.

A first metal 106, a second metal 108, a third metal 110, an MIM electrode 112, a fourth metal 114 and a fifth metal 116 are laminated above the transistors MP2, MP11, MN2 and MN11 with an inter-layer insulation film 105 interposed between the metals.

The fifth metal 116 forms the reflecting electrode PE formed per pixel.

Each diffusion layer which forms each drain of the transistors MN2 and MP2 is electrically connected to the fifth metal 116 via a contact 118, the first metal 106, a through-hole 119a, the second metal 108, a through-hole 119b, the third metal 110, a through-hole 119c, the fourth metal 114 and a through-hole 119e. Furthermore, each diffusion layer which forms each drain of the transistors MN2 and MP2 is electrically connected to the MIM electrode 112 via the contact 118, the first metal 106, the through-hole 119a, the second metal 108, the through-hole 119b, the third metal 110, the through-hole 119c, the fourth metal 114 and the through-hole 119d. That is, each source of the transistors MN2 and MP2 which constitute the switch SW2 is electrically connected to the reflecting electrode PE and the MIM electrode 112.

The reflecting electrode PE (fifth metal 116) is disposed apart from and facing the common electrode CE which is a transparent electrode with a passivation film (PSV) 117 which is a protection film formed on an upper surface of the reflecting electrode PE interposed therebetween. The liquid crystal LCM is filled and sealed between the reflecting electrode PE and the common electrode CE. The reflecting electrode PE, the common electrode CE and the liquid crystal LSM between the reflecting electrode PE and the common electrode CE constitute the liquid crystal display element LC.

In this regard, the MIM electrode 112 is formed on the third metal 110 with the inter-layer insulation film 105 interposed therebetween. These MIM electrode 112, third metal 110 and inter-layer insulation film 105 between the MIM electrode 112 and the third metal 110 constitute the capacitance C1. Hence, while the switches SW1 and SW2 and the storage unit SM1 are formed by using the first metal 106 and the second metal 108 which are the first and second layer wirings, and the transistors, the storage unit DM2 is formed by using the third metal 110 and the MIM electrode 112 which are upper layers of the switches SW1 and SW2 and the storage unit SM1. That is, the switches SW1 and SW2 and the storage unit SM1, and the storage unit DM2 are formed in the different layers.

Light from an unillustrated light source transmits through the common electrode CE and the liquid crystal LCM, enters and is reflected by the reflecting electrode PE (fifth metal 116), reversely propagates in the original entrance route, and is emitted through the common electrode CE.

Thus, the reflective liquid crystal display apparatus 10 uses the fifth metal 116 which is a fifth layer wiring as the reflecting electrode PE, the third metal 110 which is the third layer wiring as part of the storage unit DM2, and uses the first metal 106 and the second metal 108 which are the first and second wirings, and the transistors as the storage unit SM1, so that it is possible to effectively dispose the storage unit SM1, the storage unit DM2 and the reflecting electrode PE in the height direction and further miniaturize the pixels. Consequently, each pixel having a pitch equal to or less than 3 μm can be formed by the transistor whose power supply voltage is 3.3 V. By using the pixels having the pitch equal to or less than 3 it is possible to realize a liquid crystal display panel whose diagonal length is 0.55 inches, and which has 4000 pixels in a horizontal direction and 2000 pixels in a vertical direction.

(Operation of Reflective Liquid Crystal Display Apparatus 10)

Next, the operation of the reflective liquid crystal display apparatus 10 will be described with reference to FIG. 5.

Figure 5:
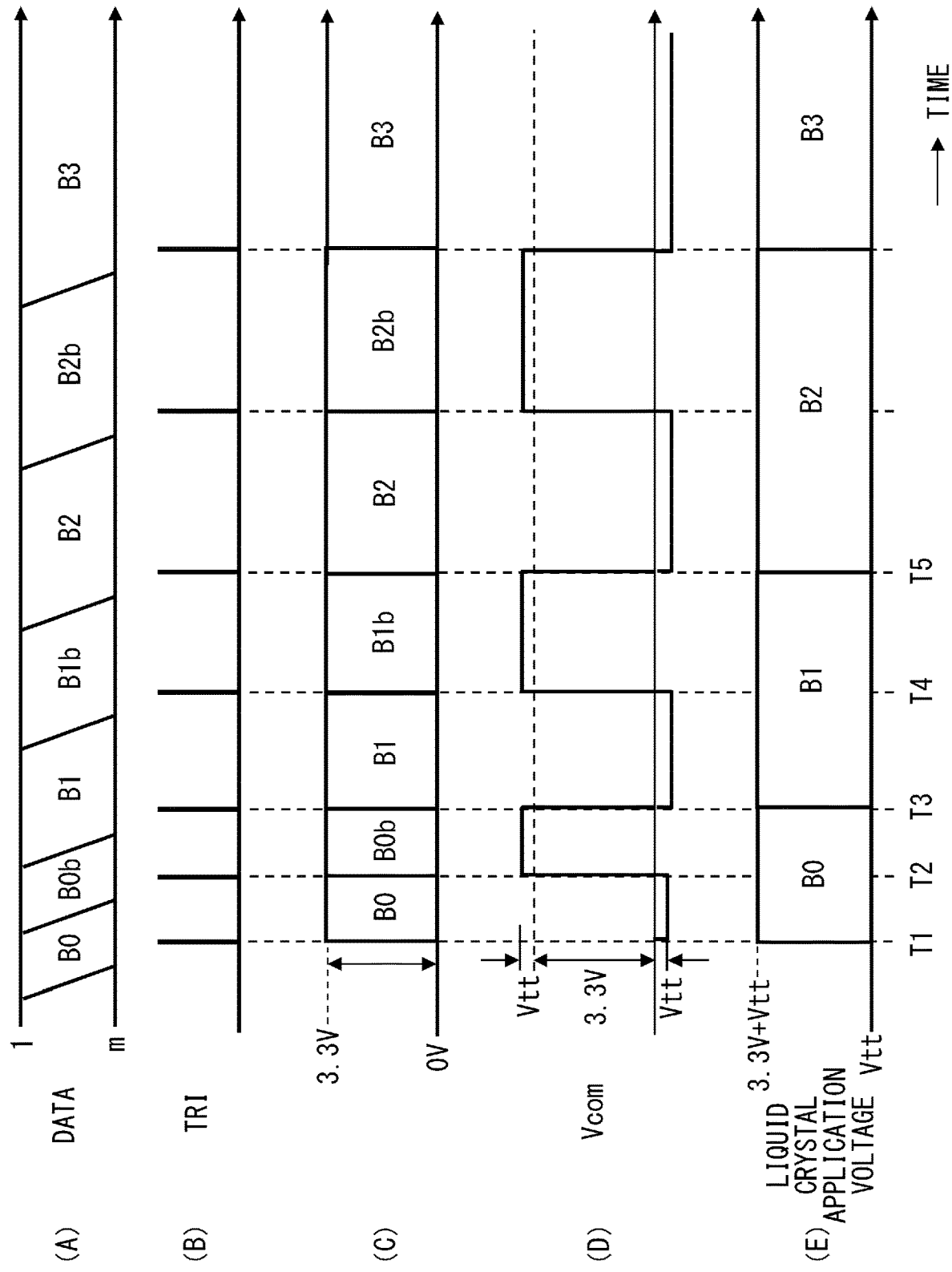
FIG. 5 is a timing chart illustrating an operation of a liquid crystal display apparatus illustrated in FIG. 1.

FIG. 5 is a timing chart illustrating the operation of the reflective liquid crystal display apparatus 10.

As described above, the reflective liquid crystal display apparatus 10 sequentially selects the row scan lines g1 to gm one by one in the 1H unit according to a row scan signal from the vertical shift register 14. Consequently, data is written in a plurality of pixels 12 which constitute the image display unit 11 in n pixel units of one row commonly connected to the selected row scan line. Furthermore, when data is written in all of a plurality of pixels 12 which constitute the image display unit 11, data of all the pixels 12 is then read all at once based on trigger pulses TRI and TRIB (more specifically, data of the storage unit SM1 in all the pixels 12 is transferred all at once to the storage unit DM2 and the reflecting electrode PE).

FIG. 5A illustrates a change in subframe data stored in each pixel 12. In addition, the vertical axis indicates a row number, and the horizontal axis indicates a time. As illustrated in FIG. 5A, boundary lines of subframe data go toward a lower right. This indicates that subframe is written with delay in a pixel of a larger row number. A period from one end to the other end of these boundary lines corresponds to a write period of the subframe data. In addition, B0b, B1b and B2b indicate inverted data of the subframe data of bits B0, B1 and B2, respectively.

FIG. 5B illustrates an output timing (rising timing) of the trigger pulse TRI. In addition, the trigger pulse TRIB indicates a value obtained by logically inverting the trigger pulse TRI at all times, and therefore is omitted. FIG. 5C schematically illustrates bits of subframe data to be applied to the reflecting electrode PE. FIG. 5D illustrates a change in a value of the common electrode voltage Vcom. FIG. 5E illustrates a change in a voltage to be applied to the liquid crystal LCM.

First, the switch SW1 is turned on in the pixel 12 selected according to a row scan signal, and therefore forward subframe data of the bit B0 outputted from the horizontal driver 16 to the column data line d is sampled by the switch SW1 and is written in the storage unit SM1. Similarly, the forward subframe data of the bit B0 is written in the storage units SM1 of all the pixels 12 which constitute the image display unit 11. Subsequently, the trigger pulse TRI of the H level (and the trigger pulse TRIB of the L level) is simultaneously supplied to all the pixels 12 which constitute the image display unit 11 (time 0).

Thus, the switches SW2 of all the pixels 12 are turned on, so that the forward subframe data of the bit B0 stored in the storage units SM1 is transferred all at once to and held by the storage units DM2 via the switches SW2, and the forward subframe data of the bit B0 is applied to the reflecting electrode PE. In addition, as is clear from FIG. 5C, a holding period of the forward subframe data of the bit B0 (an application period of the forward subframe data of the bit B0 to the reflecting electrode PE) in the storage unit DM2 is one subframe period in which the trigger pulse TRI reaches the H level again next time (time T2) after reaching the H level (time t1).

In this regard, when a bit value of subframe data is "1", i.e., the H level, the power supply voltage VDD (3.3 V in this case) is applied to the reflecting electrode PE. When the bit value is "0", i.e., the L level, the ground voltage GND (0 V) is applied to the reflecting electrode PE. On the other hand, a free voltage can be applied as the common electrode voltage Vcom to the common electrode CE without being limited to the ground voltage GND and the power supply voltage VDD, and the common electrode voltage Vcom is controlled to switch to a predetermined voltage in synchronization with an input of the forward trigger pulse TRI of the H level. In this example, as illustrated in FIG. 5D, during the subframe period in which the forward subframe data of the bit B0 is applied to the reflecting electrode PE, the common electrode voltage Vcom is set to a voltage which is lower by a threshold voltage Vtt of the liquid crystal than 0 V.

The liquid crystal display element LC displays a tone matching the application voltage of the liquid crystal LCM which is an absolute value of a differential voltage between the application voltage of the reflecting electrode PE and the common electrode voltage Vcom. Hence, as illustrated in FIG. 5E, in the subframe period (times T1 to T2) in which the forward subframe data of the bit B0 is applied to the reflecting electrode PE, the application voltage of the liquid crystal LCM is 3.3 V+Vtt (=3.3 V−(−Vtt)) when the bit value of the subframe data is "1", and is +Vtt (=0V−(−Vtt)) when the bit value of the subframe data is "0".

Figure 6:
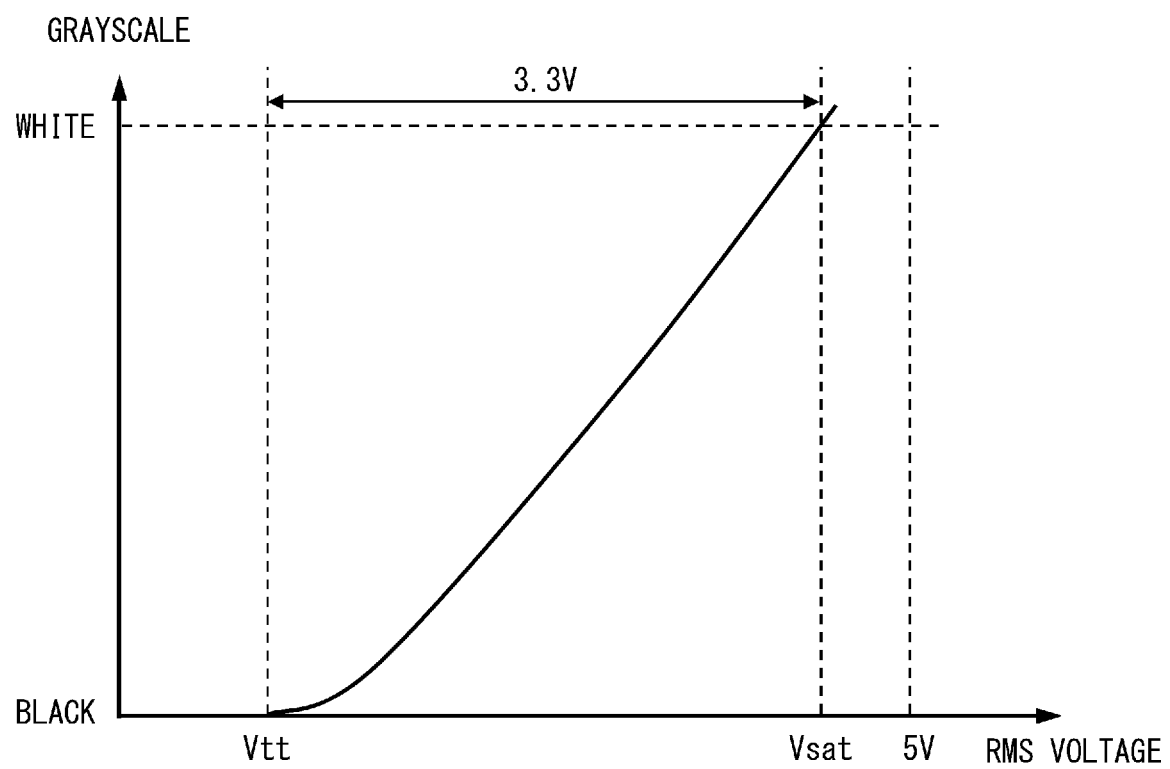
FIG. 6 is a view illustrating a relationship between a liquid crystal application voltage (RMS voltage) and a liquid crystal grayscale value.

FIG. 6 illustrates a relationship between a liquid crystal application voltage (RMS voltage) and a liquid crystal grayscale value.

In view of FIG. 6, a grayscale value curve is shifted such that a black grayscale value matches the RMS voltage of the threshold voltage Vtt of the liquid crystal and a white grayscale value matches the RMS voltage of a saturation voltage Vsat (=3.3 V+Vtt) of the liquid crystal. It is possible to match the grayscale value with an effective portion of a liquid crystal response curve. Hence, the liquid crystal display element LC displays white when the application voltage of the liquid crystal LCM is (3.3 V+Vtt) as described above, and displays black when the application voltage is +Vtt.

Back to FIG. 5, in the subframe period (times T1 to T2) in which the liquid crystal display element LC displays the forward subframe data of the bit B0, inverted subframe data of the bit B0 starts being sequentially written in the storage units SM1 of all the pixels 12 which constitute the image display unit 11. Furthermore, when the inverted subframe data of the bit B0 is written in the storage units SM1 of all the pixels 12 which constitute the image display unit 11, the trigger pulse TRI of the H level (and the trigger pulse TRIB of the L level) is then simultaneously supplied to all the pixels 12 which constitute the image display unit 11 (time T2).

Thus, the switches SW2 of all the pixels 12 are turned on, and therefore the inverted subframe data of the bit B0 stored in the storage units SM1 is transferred all at once to and held by the storage units DM2 via the switches SW2, and the inverted subframe data of the bit B0 is applied to the reflecting electrode PE. In this regard, as is clear from FIG. 5C, a holding period of the inverted subframe data of the bit B0 (an application period of the inverted subframe data of the bit B0 to the reflecting electrode PE) in the storage unit DM2 is one subframe period in which the trigger pulse TRI reaches the H level again next time (time t3) after reaching the H level (time T2). In this regard, the inverted subframe data of the bit B0 has a relationship of a reverse logical value with the forward subframe data of the bit B0 at all times, and therefore is "0" when the forward subframe data of the bit B0 is "1" and is "1" when the forward subframe data of the bit B0 is "0".

On the other hand, as illustrated in FIG. 5D, during the subframe period in which the inverted subframe data of the bit B0 is applied to the reflecting electrode PE, the common electrode voltage Vcom is applied to a voltage which is higher by the threshold voltage Vtt of the liquid crystal than 3.3 V. Hence, in the subframe period (times T2 to T3) in which the inverted subframe data of the bit B0 is applied to the reflecting electrode PE, the application voltage of the liquid crystal LCM is −Vtt (=3.3 V−(3.3 V+Vtt)) when the bit value of the subframe data is "1", and is −3.3 V−Vtt (=0 V−(3.3 V+Vtt)) when the bit value of the subframe data is "0".

When, for example, the bit value of the forward subframe data of the bit B0 is "1", the bit value of the inverted subframe data of the bit B0 to be subsequently applied is "0". In this case, the application voltage of the liquid crystal LCM is −(3.3 V+Vtt), and a potential direction becomes reverse yet the absolute value is the same compared to a case where the forward subframe data of the bit B0 is applied. Hence, even when the inverted subframe data of the bit B0 is applied, the pixel 12 displays white similar to a case where the forward subframe data of the bit B0 is applied. Furthermore, when the bit value of the forward subframe data of the bit B0 is "0", the bit value of the inverted subframe data of the bit B0 to be subsequently applied is "1". In this case, the application voltage of the liquid crystal LCM is −Vtt, and the potential direction becomes reverse yet the absolute value is the same compared to a case where the forward subframe data of the bit B0 is applied. Hence, when the inverted subframe data of the bit B0 is applied, too, the pixel 12 displays black similar to a case where the forward subframe data of the bit B0 is applied.

Hence, as illustrated in FIG. 5E, during two subframe periods of the times T1 to T3, the pixel 12 displays the same tone as the bit B0 and the complementary bit B0B of the bit B0, and performs alternating driving of reversing the potential direction of the liquid crystal LCM per subframe, so that it is possible to prevent burn-in of the liquid crystal LCM.

Next, in the subframe period (times T2 to T3) in which the liquid crystal display element LC displays the inverted subframe data of the bit B0, the forward subframe data of the bit B1 starts being sequentially written in the storage units SM1 of all the pixels 12. Furthermore, when the forward subframe data of the bit B1 is written in the storage units SM1 of all the pixels 12 of the image display unit 11, the trigger pulse TRI of the H level (and the trigger pulse TRIB of the L level) is then simultaneously supplied to all the pixels 12 which constitute the image display unit 11 (time T3).

Thus, the switches SW2 of all the pixels 12 are turned on, so that the forward subframe data of the bit B1 stored in the storage units SM1 is transferred all at once to and held by the storage units DM2 via the switches SW2, and the forward subframe data of the bit B1 is applied to the reflecting electrode PE. In addition, as is clear from FIG. 5C, in a holding period of the forward subframe data of the bit B1 (an application period of the forward subframe data of the bit B to the reflecting electrode PE) in the storage unit DM2 is one subframe period in which the trigger pulse TRI reaches the H level again next time (time T4) after reaching the H level (time T3).

On the other hand, as illustrated in FIG. 5D, in the subframe period in which the forward subframe data of the bit B1 is applied to the reflecting electrode PE, the common electrode voltage Vcom is set to a voltage which is lower by the threshold voltage Vtt of the liquid crystal than 0 V. Consequently, as illustrated in FIG. 5E, in the subframe period (times T3 to T4) in which the forward subframe data of the bit B1 is applied to the reflecting electrode PE, the application voltage of the liquid crystal LCM is 3.3 V+Vtt (=3.3 V−(−Vtt)) when the bit value of the subframe data is "1", and is +Vtt (=0 V−(−Vtt)) when the bit value of the subframe data is "0".

Next, in the subframe period (times T3 to T4) in which the liquid crystal display element LC displays the forward subframe data of the bit B1, the inverted subframe data of the bit B1 starts being sequentially written in the storage units SM1 of all the pixels 12 which constitute the image display unit 11. Furthermore, when the inverted subframe data of the bit B1 is written in the storage units SM1 of all the pixels 12 which constitute the image display unit 11, the trigger pulse TRI of the H level (and the trigger pulse TRIB of the L level) is then simultaneously supplied to all the pixels 12 which constitute the image display unit 11 (time T4).

Thus, the switches SW2 of all the pixels 12 are turned on, so that the inverted subframe data of the bit B1 stored in the storage units SM1 are transferred all at once to and held by the storage units DM2 via the switches SW2, and the inverted subframe data of the bit B1 is applied to the reflecting electrode PE. In this regard, as is clear from FIG. 5C, in a holding period of the inverted subframe data of the bit B1 (an application period of the inverted subframe data of the bit B1 to the reflecting period PE) in the storage unit DM2 is one subframe period in which the trigger pulse TRI reaches the H level again next time (time T5) after reaching the H level (time T4). In this regard, the inverted subframe data of the bit B1 has a relationship of a reverse logical value with the forward subframe data of the bit B1 at all times.

On the other hand, as illustrated in FIG. 5D, during the subframe period in which the inverted subframe data of the bit B1 is applied to the reflecting electrode PE, the common electrode voltage Vcom is set to a voltage which is higher by the threshold voltage Vtt of the liquid crystal than 3.3 V. Hence, in the subframe period (times T4 to T5) in which the inverted subframe data of the bit B1 is applied to the reflecting electrode PE, the application voltage of the liquid crystal LCM is −Vtt (=3.3 V−(3.3 V+Vtt)) when the bit value of the subframe data is "1", and is −3.3 V−Vtt (=0 V−(3.3 V+Vtt)) when the bit value of the subframe data is "0".

Consequently, as illustrated in FIG. 5E, during the two subframe periods of the times T3 to T5, the pixel 12 displays the same tone as the bit B1 and the complementary B1b of the bit B1, and performs alternating driving of reversing the potential direction of the liquid crystal LCM per subframe, so that it is possible to prevent burn-in of the liquid crystal LCM. The same operation is repeatedly performed on the bit B2 and subsequent bits, too.

In this way, the reflective liquid crystal display apparatus 10 displays the tone based on a combination of a plurality of subframes.

In addition, each display period of the bit B0 and the complementary bit B0b is the same first subframe period, and, furthermore, each display period of the bit B1 and the complementary B1b is also the same second subframe period. However, the first subframe period and the second subframe period are not necessarily the same period. In this regard, for example, the second subframe period is set twice as the first subframe period. Furthermore, as illustrated in FIG. 5E, the third subframe period which is each display period of the bit B2 and the complementary bit B2b is set twice as the second subframe period. The same applies to other subframe periods, too. The duration of each subframe period and the number of subframes can be optionally set according to a system specification.

(Detailed Description of Dummy Pixel 12d and Temperature Sensor S1 Disposed Therein)

The details of the dummy pixel 12d and the temperature sensor S1 disposed therein will be described hereinafter. As described earlier, the dummy pixel 12d is composed of the dummy liquid crystal display element and the circuit unit, and the temperature sensor S1 for detecting the temperature of the pixel 12 is formed in this circuit unit.

The dummy pixel 12d (stated differently, the temperature sensor S1) is disposed (formed) instead of the pixel 12 in a certain region of a plurality of pixel regions having a rectangular shape when viewed from above. In the example of FIG. 1, the dummy pixel 12d (stated differently, the temperature sensor S1) is disposed instead of the pixel 12 in one region located at a corner (a region at the lower left corner in the figure) among the plurality of pixel regions having a rectangular shape when viewed from above.

Figure 7:
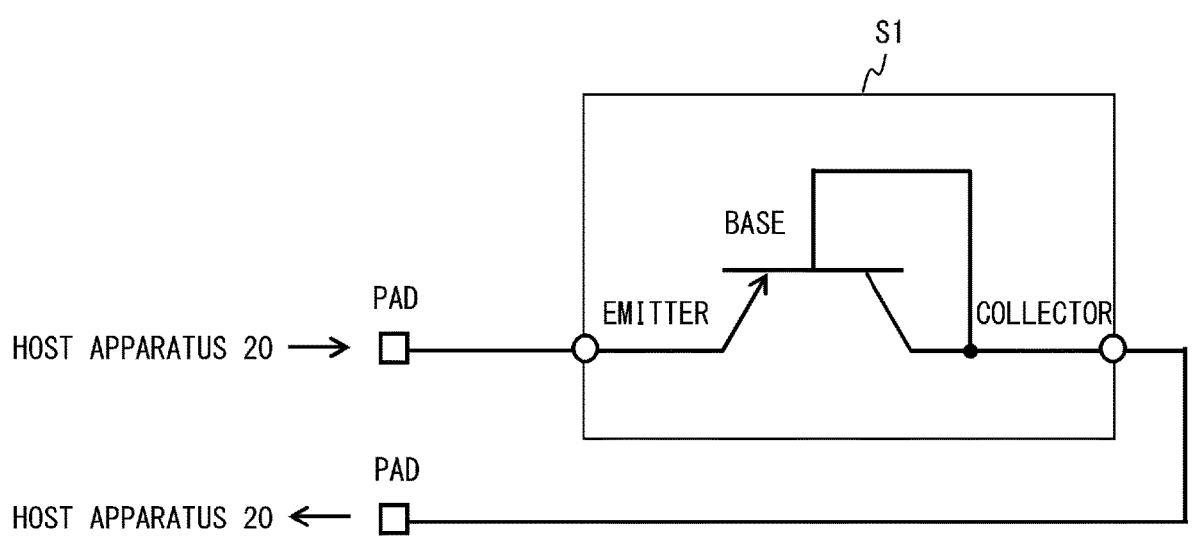
FIG. 7 is a circuit diagram illustrating a specific configuration of a temperature sensor part of a dummy pixel provided to the liquid crystal display apparatus shown in FIG. 1.

FIG. 7 is a circuit diagram illustrating a specific configuration of the temperature sensor S1.

As illustrated in FIG. 7, the temperature sensor S1 is a PN junction diode formed by short-circuiting a base electrode and a collector electrode of a PNP bipolar transistor, for example. The host apparatus 20 can calculate the temperature of the pixel 12 by flowing a constant current between the anode and the cathode of the PN junction diode (the emitter and the collector of the PNP bipolar transistor) and measuring a potential difference between the electrodes, for example. Because the temperature sensor S1 is placed adjacent to the pixel 12, it is possible to detect the temperature of the pixel 12 with high accuracy and at real time.

(Cross-Sectional Structure of Dummy Pixel 12d)

Figure 8:
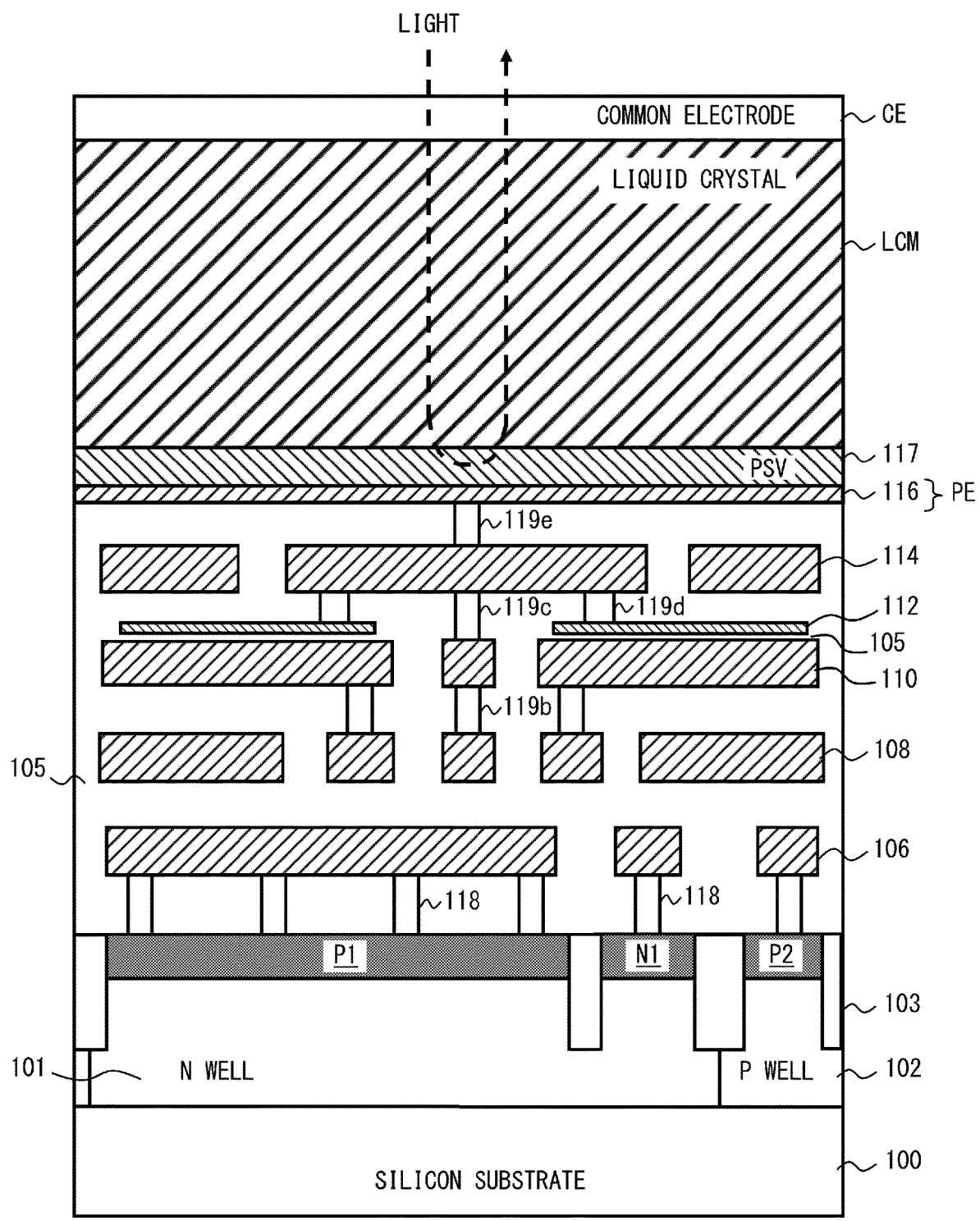
FIG. 8 is a schematic cross-sectional view of the dummy pixel provided to the liquid crystal display apparatus shown in FIG. 1.

FIG. 8 is a schematic cross-sectional view illustrating main units of the dummy pixel 12d.

The dummy pixel 12d shown in FIG. 8 has a different structure from the pixel 12 illustrated in FIG. 8 in the first metal 106 and the lower layers, and has basically the same structure except for them.

The temperature sensor S1 is formed in the first metal 106 and the lower layers.

First, a PNP bipolar transistor which is used for the temperature sensor S1 is formed using the N well 101, the P well 102, and diffusion electrodes P1, N1 and P2. To be specific, a P-type diffusion electrode P1 and an N-type diffusion electrode N1 formed on the N well 101 are used as an emitter electrode (P1) and a base electrode (N1), respectively, and a P-type diffusion electrode P2 formed on the P well 102 is used as a collector electrode (P2). The emitter electrode P1 and the base electrode N1 are in PN junction through the N well 101, and the collector electrode P2 and the base electrode N1 are in PN junction through the P well 102 and the N well 101. In this structure, the PNP bipolar transistor is formed. Further, the base electrode N1 and the collector electrode P2 are short-circuited through the contact 118 and the first metal 106. In this structure, the PN junction diode, which is the temperature sensor S1, is formed. Each of the anode and the cathode of the PN junction diode (the emitter electrode P1 and the collector electrode P2) is connected to the external host apparatus (not illustrated) 20 through the contact 118, the first metal 106, a bonding wire (not illustrated) and the like.

(Planar Structure of Temperature Sensor S1)

Figure 9:
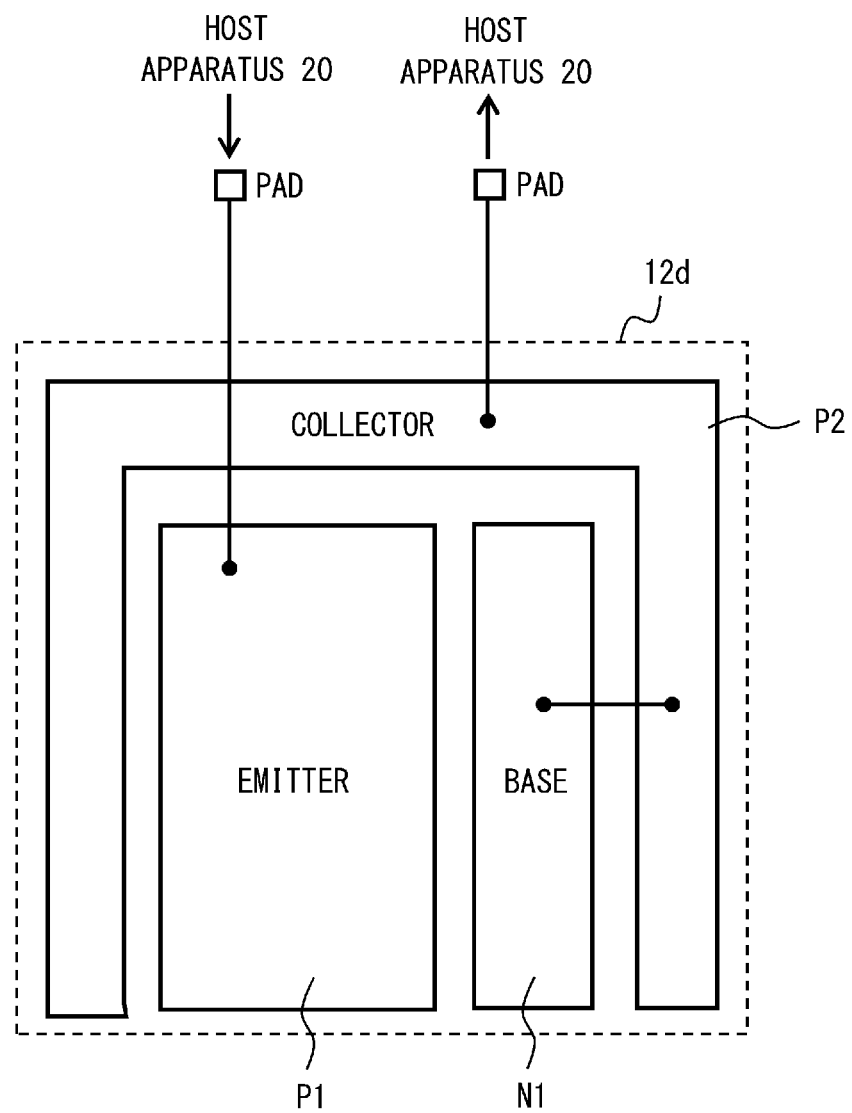
FIG. 9 is a schematic plan view of a temperature sensor part of the dummy pixel provided to the liquid crystal display apparatus shown in FIG. 1.

FIG. 9 is a schematic plan view of electrodes of the PNP bipolar transistor which is used for the temperature sensor S1.

As illustrated in FIG. 9, the electrodes of the PNP bipolar transistor which is used for the temperature sensor S1 are formed in one pixel region. To be specific, the P-type diffusion electrode P1 which is used as the emitter electrode, the N-type diffusion electrode N1 which is used as the base electrode, and the P-type diffusion electrode P2 which is used as the collector electrode are formed in one pixel region. A PN junction diode is formed by short-circuiting the base electrode N1 and the collector electrode of the PNP bipolar transistor through the first metal 106 or the like. The anode and the cathode of the PN junction diode (the emitter electrode P1 and the collector electrode P2) are both connected to the host apparatus (not shown) 20 through the contact 118, the first metal 106, a bonding wire (not shown) and the like.

Note that two lines extending from the temperature sensor S1 to chip pads toward the host apparatus 20 are preferably adjacent to each other in parallel. Then, even when noise occurs, noise of the same level occurs in each of the two lines, and therefore the noises are cancelled when measuring a potential difference between the two lines. As a result, the present structure using the temperature sensor S1 can more accurately measure the temperature of the pixel 12.

Although the example of FIG. 9 describes the case where the temperature sensor S1 is the PNP bipolar transistor in diode connection, it is not limited thereto. The temperature sensor S1 may be an NPN bipolar transistor in diode connection, or a general diode.

The pattern shape of the second metal 108 and the upper layers of the dummy pixel 12d is basically the same as the pattern shape of the pixel 12. Thus, the amount of light entering the substrate through a gap of the reflecting electrode PE (the fifth metal 116), out of the light incident from above the substrate, is the same as that in the pixel 12. Therefore, the temperature sensor S1 in the dummy pixel 12d can detect the temperature in the same environment as the pixel 12 regarding the amount of light incident on the pixel, and it is thereby possible to more accurately detect the temperature of the pixel 12. Hence, the present structure can measure the temperature of the pixel 12 with higher accuracy compared with the case of measuring the temperature with a temperature sensor attached onto a heatsink.

When a display pattern changes due to a difference in picture, the operations of the circuit blocks such as the timing generator 13, the vertical shift register 14 and the horizontal driver 16 illustrated in FIG. 1 change according to the display pattern, and current consumption in each circuit block also changes according to the display pattern. In the circuit block where current consumption has increased, IR drop can occur, which can cause a power supply voltage to fall and a ground voltage to rise. The place of occurrence of IR drop changes depending on the display pattern, and the place where a power supply voltage and a ground voltage vary also changes depending on the display pattern. Therefore, when a temperature sensor is placed in an empty space in a region surrounding a panel formed by a plurality of pixels, it is affected by the IR drop, and accurate and real-time measurement of the temperature of the pixel 12 is not achieved.

On the other hand, in the liquid crystal display apparatus according to this embodiment, the temperature sensor S1 is placed in the pixel region, and it is thereby possible to detect the temperature in the same environment as the pixel 12 without being affected by a peripheral circuit for driving the pixel 12, and therefore accurate and real-time measurement of the temperature of the pixel 12 is achieved.

(Cross-Sectional Structure of Dummy Liquid Crystal Display Element LCd)

Referring back to FIG. 8, the reflecting electrode PE, the PSV 117, the liquid crystal LCM and the common electrode CE are sequentially formed above the circuit unit of the dummy pixel 12d, just like in the pixel 12, and a dummy liquid crystal display element LCd is formed using them. The reflecting electrode PE of the dummy liquid crystal display element LCd is connected to the reflecting electrode PE of the liquid crystal display element LC disposed in the pixel 12 adjacent to the dummy pixel 12d. This is specifically described hereinafter.

(Planar Structure of Pixel 12 and Dummy Pixel 12d)

Figure 10:
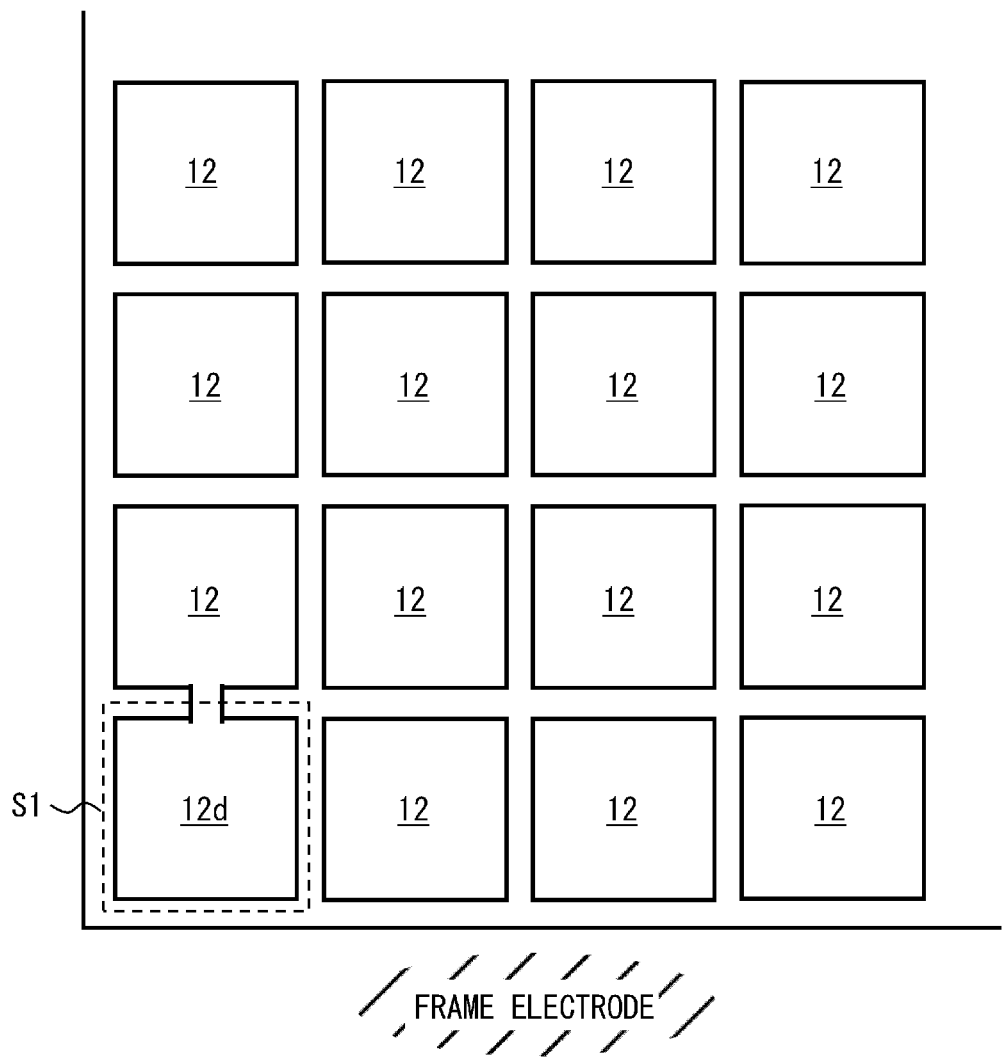
FIG. 10 is a schematic plan view of a reflecting electrode used in each of a plurality of pixels and a dummy pixel disposed in a pixel region of the liquid crystal display apparatus shown in FIG. 1.

FIG. 10 is a schematic plan view illustrating a part of the reflecting electrode PE which is used in each of the plurality of pixels 12 and the dummy pixel 12d.

In the example of FIG. 10, the dummy pixel 12d is disposed in a region located at a corner, and the plurality of pixels 12 are disposed in a plurality of other regions among a plurality of pixel regions having a rectangular shape when viewed from above. Further, a frame electrode is disposed in a peripheral region of the plurality of pixel regions. The alternating signal FR is supplied as the common electrode voltage Vcom to the frame electrode and also to the common electrodes CE of the plurality of pixels 12 and the dummy pixel 12d. A potential difference between the frame electrode and the common electrodes CE is thereby 0V, and the frame electrode displays black.

The reflecting electrode PE of the dummy liquid crystal display element LCd placed in the dummy pixel 12d is connected to the reflecting electrode PE of the liquid crystal display element LC placed in the pixel 12 adjacent to the dummy pixel 12d (the pixel 12 immediately above the dummy pixel 12d in the figure). The reflecting electrode PE of the dummy pixel 12d and the circuit unit in the lower layers are electrically separated by adjusting the pattern of contacts and through-holes. Therefore, the same voltage is applied to the reflecting electrode PE in the dummy pixel 12d and the reflecting electrode PE in the adjacent pixel 12.

Thus, in the dummy pixel 12d, the same picture (image) as the picture in the adjacent pixel 12 connected to this dummy pixel 12d is displayed. However, in the case of a panel with 4K×2K resolution, for example, because the same picture as the picture in the adjacent pixel 12 is displayed only in one dummy pixel 12d at the corner, irregularities in image on the entire screen are negligibly small. Further, even when a whole black screen or a whole white screen is displayed, a bright spot where only one pixel is bright or a black spot does not occur. Further, while a defect is recognized in an alternative horizontal line, because the dummy pixel 12d is only one pixel at a corner of the screen, it is hardly recognized.

Note that the dummy pixel 12d and the adjacent pixel 12 connected thereto may be short-circuited through a lower-layer metal, a through-hole, a contact or the like, rather than directly short-circuiting the reflecting electrodes. In this case, the shape of the reflecting electrode PE in the dummy pixel 12d can be the same as the shape of the reflecting electrode PE in the adjacent pixel 12, so that the dummy pixel 12d and the pixel 12 have the same aperture ratio.

Further, because the dummy pixel 12d is disposed at a corner of the screen, it is easy to run the two lines extending from the temperature sensor S1 to chip pads toward the host apparatus 20.

Although the case where the dummy pixel 12d is disposed in a region located at a corner among a plurality of pixel regions having a rectangular shape when viewed from above is described as an example in this embodiment, the present invention is not limited thereto. The dummy pixel 12d may be disposed in any of regions located along a peripheral line among a plurality of pixel regions having a rectangular shape when viewed from above. In this case, it is easy to run the two lines extending from the temperature sensor S1 to chip pads toward the host apparatus 20. Alternatively, to improve the temperature detection accuracy by the temperature sensor S1, the dummy pixel 12d may be disposed in any of internal regions among a plurality of pixel regions having a rectangular shape when viewed from above.

Further, although the case where the dummy pixel 12d is disposed in one region among a plurality of pixel regions is described as an example in this embodiment, the present invention is not limited thereto. The dummy pixel 12d may be disposed in a plurality of regions among a plurality of pixel regions. The area of the temperature sensor S1 thereby increases, which improves the temperature detection accuracy by the temperature sensor S1. This is described in detail in a second embodiment below.

Second Embodiment

Figure 11:
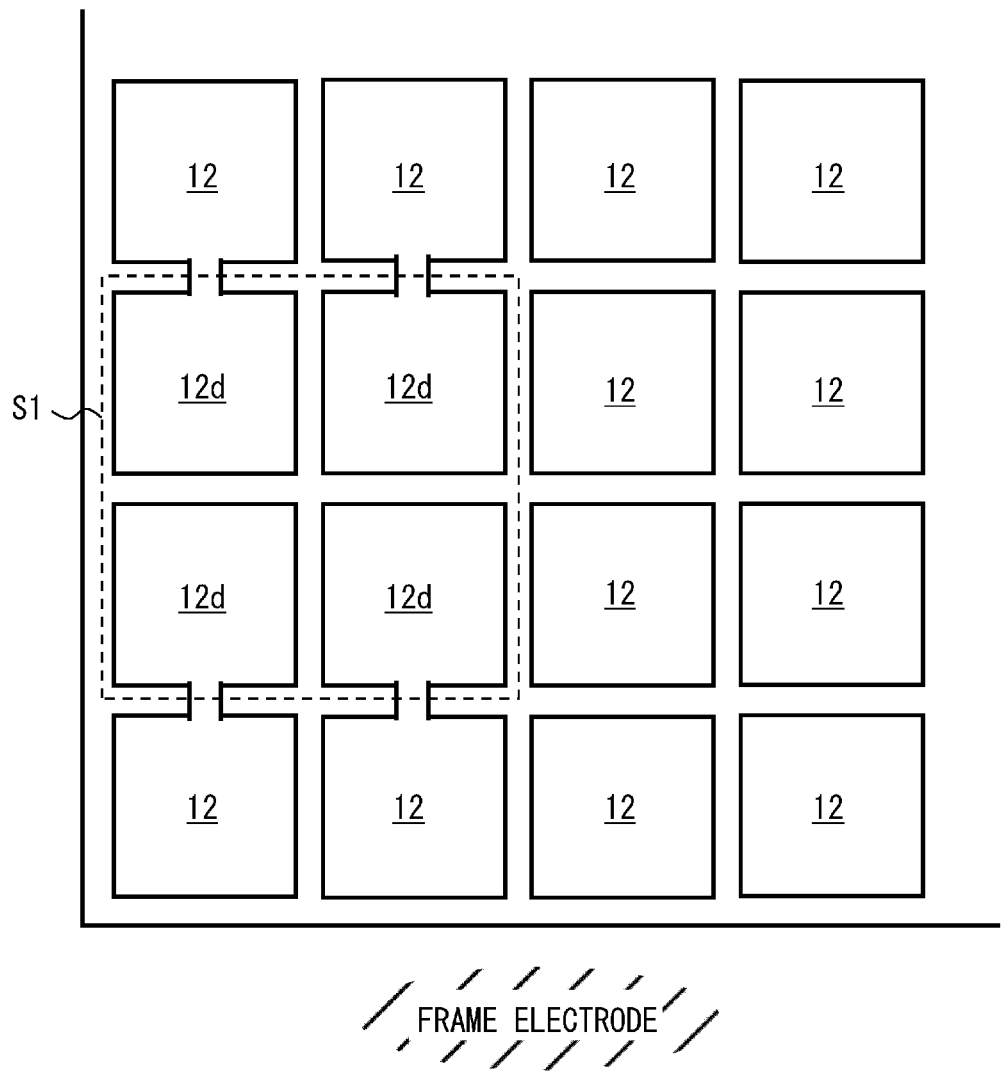
FIG. 11 is a schematic plan view of a reflecting electrode used in each of a plurality of pixels and a dummy pixel disposed in a pixel region of a liquid crystal display apparatus according to a second embodiment.

FIG. 11 is a schematic plan view illustrating a part of the reflecting electrode PE which is used in each of the plurality of pixels 12 and the dummy pixel 12d in a liquid crystal display apparatus according to a second embodiment. In the example of FIG. 11, four dummy pixels 12d are respectively disposed in 2×2 (total four) pixel regions adjacent to each other, and a plurality of pixels 12 are disposed in a plurality of other regions among a plurality of pixel regions having a rectangular shape when viewed from above.

The temperature sensor S1 may be formed by connecting in parallel four PNP bipolar transistors respectively formed in the four dummy pixels 12d, or may be formed using one PNP bipolar transistor formed in a large size in the circuit units of the four dummy pixels 12d. When a plurality of dummy pixels 12d are disposed, it is possible to form a PN junction diode for the temperature sensor S1 with a higher degree of flexibility than when one dummy pixel 12d is disposed. By disposing a plurality of dummy pixels 12d and connecting a plurality of temperature sensors S1 in parallel or placing one large temperature sensor S1, it is possible to improve the accuracy of the measurement temperature.

Further, a frame electrode is disposed in a peripheral region of the plurality of pixel regions. The alternating signal FR is supplied as the common electrode voltage Vcom to the frame electrode and also to the common electrodes CE of the plurality of pixels 12 and the four dummy pixels 12d. A potential difference between the frame electrode and the common electrodes CE is thereby 0V, and the frame electrode displays black.

The reflecting electrodes PE of the total four dummy pixels 12d respectively disposed in the 2×2 pixel regions are respectively connected to the reflecting electrodes PE of the four adjacent pixels 12. The reflecting electrode PE in the dummy pixel 12d and the circuit unit in the lower layers are electrically separated by adjusting the pattern of contacts and through-holes. Therefore, the same voltage is applied to the reflecting electrode PE in the dummy pixel 12d and the reflecting electrode PE in the adjacent pixel 12.

Thus, in the four dummy pixels 12d, the same picture (image) as the picture in the four adjacent pixels 12 connected to them is displayed. However, in the case of a panel with 4K×2K resolution, for example, because the same picture as the picture in the adjacent pixel 12 is displayed only in the four dummy pixels 12d, irregularities in image on the entire screen caused by them are negligibly small. Further, even when a whole black screen or a whole white screen is displayed, a bright spot where only four pixels are bright or a black spot does not occur.

Further, in the example of FIG. 11, the reflecting electrodes PE of the four adjacent pixels 12 are not connected to the reflecting electrode PE of a common adjacent pixel 12 but are connected to the reflecting electrodes PE of different adjacent pixels 12. The pictures (images) of different adjacent pixels 12 are thereby displayed in the four adjacent pixels 12, which make irregularities in image on the entire screen less recognizable.

Note that the dummy pixel 12d and the adjacent pixel 12 connected thereto may be short-circuited through a lower-layer metal, a through-hole, a contact or the like, rather than directly short-circuiting the reflecting electrodes. In this case, the shape of the reflecting electrode PE in the dummy pixel 12d can be the same as the shape of the reflecting electrode PE in the adjacent pixel 12, so that the dummy pixel 12d and the pixel 12 have the same aperture ratio.

Although the case where the total four (2×2) dummy pixels 12d adjacent to each other are disposed is described in this embodiment, the present invention is not limited thereto. An arbitrary number of dummy pixels 12d within an acceptable range may be disposed. Further, the plurality of dummy pixels 12d are not necessarily adjacent to each other.

Third Embodiment

Figure 12:
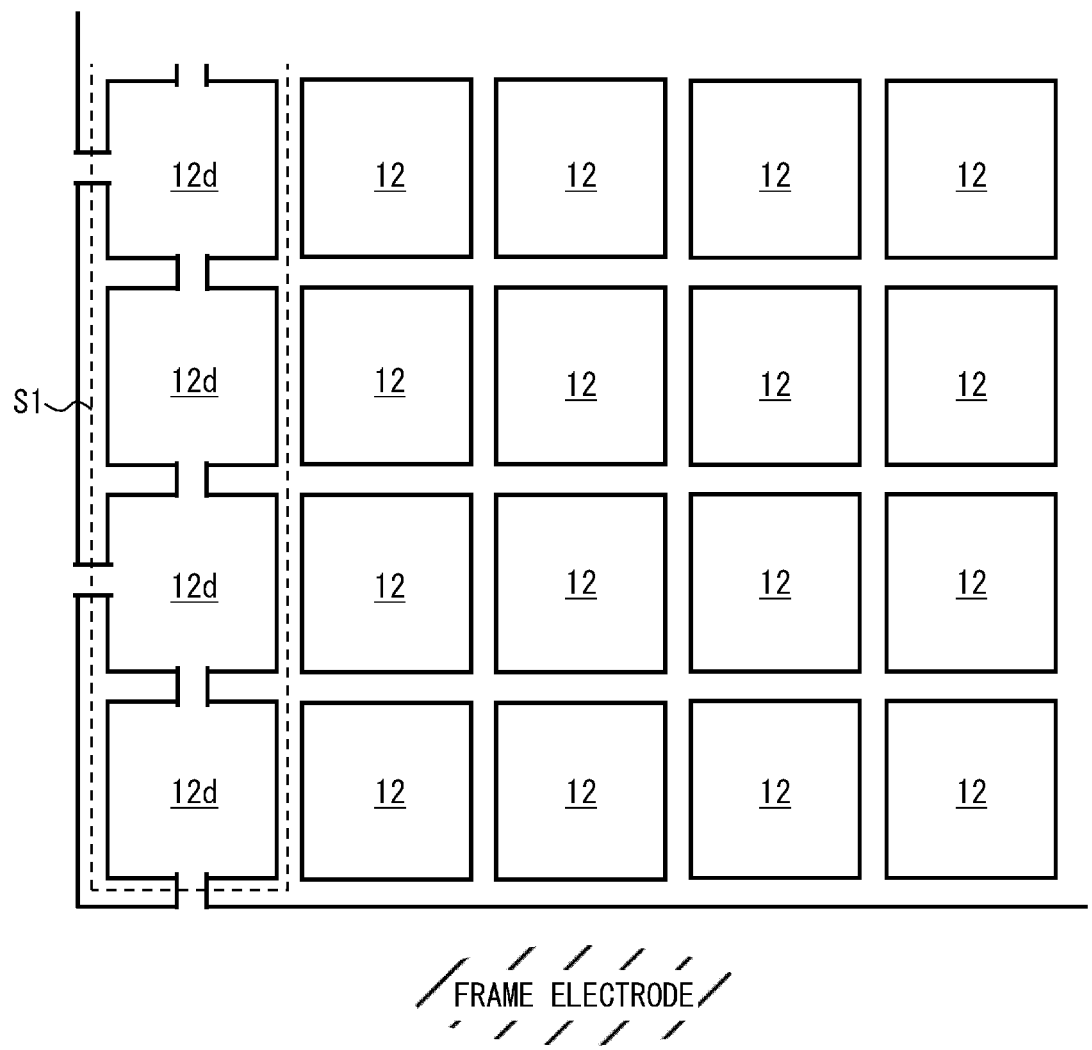
FIG. 12 is a schematic plan view of a reflecting electrode used in each of a plurality of pixels and a dummy pixel disposed in a pixel region of a liquid crystal display apparatus according to a third embodiment.

FIG. 12 is a schematic plan view illustrating a part of the reflecting electrode PE which is used in each of the plurality of pixels 12 and the dummy pixel 12d in a liquid crystal display apparatus according to a third embodiment.

In the example of FIG. 12, a plurality of dummy pixels 12d are respectively disposed in a plurality of regions disposed along one peripheral side, and a plurality of pixels 12 are disposed in a plurality of other regions among a plurality of pixel regions having a rectangular shape when viewed from above.

The temperature sensor S1 may be formed by connecting in parallel a plurality of PNP bipolar transistors respectively formed in the plurality of dummy pixels 12d, or may be formed using one PNP bipolar transistor formed in a large size in the circuit units of the plurality of dummy pixels 12d. When a plurality of dummy pixels 12d are disposed, it is possible to form a PN junction diode for the temperature sensor S1 with a higher degree of flexibility than when one dummy pixel 12d is disposed. By disposing a plurality of dummy pixels 12d and connecting a plurality of temperature sensors S1 in parallel or placing one large temperature sensor S1, it is possible to improve the accuracy of the measurement temperature.

Further, a frame electrode is disposed in a peripheral region of the plurality of pixel region. The alternating signal FR is supplied as the common electrode voltage Vcom to the frame electrode and also to the common electrodes CE of the plurality of pixels 12 and the plurality of dummy pixels 12d. A potential difference between the frame electrode and the common electrodes CE is thereby 0V, and the frame electrode displays black.

The reflecting electrodes PE of the plurality of dummy pixels 12d disposed along one peripheral side of the entire screen are all connected to the frame electrode. The reflecting electrode PE in the dummy pixel 12d and the circuit unit in the lower layers are electrically separated by adjusting the pattern of contacts and through-holes. Therefore, the same voltage is applied to the reflecting electrode PE in the dummy pixel 12d and the frame electrode.

Thus, in the plurality of dummy pixels 12d disposed along one peripheral side of the entire screen, black, which is the same as in the frame electrode, is displayed instead of a dummy picture (image). However, because black displayed by the plurality of dummy pixels 12d is continuous to black displayed by the frame electrode, an image in only one row of pixels, out of the image on the entire screen, ceases to be displayed, and therefore irregularities such as displaying the same picture do not occur.

Note that the reflecting electrode PE of the dummy pixel 12d and the frame electrode connected thereto may be short-circuited through a lower-layer metal, a through-hole, a contact or the like, rather than directly short-circuiting the reflecting electrodes. In this case, the shape of the reflecting electrode PE in the dummy pixel 12d can be the same as the shape of the reflecting electrode PE in the adjacent pixel 12, so that the dummy pixel 12d and the pixel 12 have the same aperture ratio.

Although the case where one row of a plurality of dummy pixels 12d are disposed along one peripheral side among a plurality of pixel regions having a rectangular shape when viewed from above is described in this embodiment, the present invention is not limited thereto. An arbitrary number of rows of dummy pixels 12d within an acceptable range may be disposed. Further, a plurality of dummy pixels 12d may be disposed along each of two or more sides, not limited to one peripheral side.

As described above, in the liquid crystal display apparatus according to the first to third embodiments, the dummy pixel 12d including the temperature sensor S1 is placed in a certain region of a plurality of pixel regions, and it is thereby possible to measure the temperature of the pixel 12 with high accuracy and at real time. Further, in the liquid crystal display apparatus according to the first to third embodiments, because the temperature sensor can be formed using the circuit unit of the dummy pixel 12d, there is no need to separately prepare and install a temperature sensor, and it is thereby possible to reduce the material cost and the installation cost of the temperature sensor.

A means of connecting the reflecting electrode PE of the dummy pixel 12d with the reflecting electrode PE of the pixel 12 or the frame electrode is not limited to the one described above, and an arbitrary connection means may be used without departing from the scope of the invention.

According to this embodiment, it is possible to provide a reflective liquid crystal display apparatus capable of accurately measuring the temperature of a pixel.

What is claimed is:

1. A reflective liquid crystal display apparatus comprising:
a plurality of pixels; and
a temperature sensor,
wherein each of the pixels includes:
   a liquid crystal display element composed of a common electrode, a reflecting electrode, and liquid crystal sealed therebetween; and
   a circuit unit configured to apply a voltage in accordance with an image to be displayed to the reflecting electrode,
wherein the temperature sensor is formed in a region corresponding to the circuit unit of the pixel and in one or more regions among a plurality of pixel regions partitioned into rows and columns,
wherein the reflective liquid crystal display apparatus further includes a dummy liquid crystal display element formed to cover the temperature sensor,
wherein a reflecting electrode of the dummy liquid crystal display element is formed so as to be short-circuited with a reflecting electrode of the liquid crystal display element disposed in the pixel adjacent to the dummy liquid crystal display element, and
wherein, when a temperature is measured, a potential of the reflecting electrode of the dummy liquid crystal display element and a potential of the reflecting electrode of the pixel short-circuited with the reflecting electrode of the dummy liquid crystal display element are the same.

2. The reflective liquid crystal display apparatus according to claim 1, wherein the temperature sensor is formed in any one of a plurality of regions disposed along a peripheral side among the plurality of pixel regions having a rectangular shape.

3. The reflective liquid crystal display apparatus according to claim 1, further comprising:
a dummy liquid crystal display element formed to cover the temperature sensor,
wherein the temperature sensor is formed in a plurality of regions disposed along a peripheral side among the plurality of pixel regions having a rectangular shape when viewed from above, and
wherein a reflecting electrode of the dummy liquid crystal display element is formed so as to be short-circuited with a frame electrode surrounding the plurality of pixel regions.

* * * * *